United States Patent
Tien

(10) Patent No.: US 9,965,664 B2
(45) Date of Patent: May 8, 2018

(54) MOBILE DATA COLLECTOR WITH KEYBOARD

(71) Applicant: RIOTEC CO., LTD., New Taipei (TW)

(72) Inventor: Kai-Yuan Tien, New Taipei (TW)

(73) Assignee: RIOTEC CO., LTD., New Taipei (TW)

( * ) Notice: Subject to any disclaimer, the term of this patent is extended or adjusted under 35 U.S.C. 154(b) by 0 days. days.

(21) Appl. No.: 15/459,969

(22) Filed: Mar. 15, 2017

(65) Prior Publication Data

US 2018/0060628 A1 Mar. 1, 2018

(30) Foreign Application Priority Data

Sep. 1, 2016 (TW) .............................. 105213451 U

(51) Int. Cl.
*G06K 7/10* (2006.01)
*G06K 19/06* (2006.01)
*G06K 7/14* (2006.01)

(52) U.S. Cl.
CPC ....... *G06K 7/10881* (2013.01); *G06K 7/1413* (2013.01); *G06K 19/06028* (2013.01)

(58) Field of Classification Search
CPC ................. G06K 7/10881; G06K 2007/10524
USPC .................................................. 235/462.45
See application file for complete search history.

(56) References Cited

U.S. PATENT DOCUMENTS

| | | | |
|---|---|---|---|
| 8,144,456 B1* | 3/2012 | Kunert .................. | G06F 1/1626 345/642 |
| 2006/0105722 A1* | 5/2006 | Kumar .................. | G06F 1/1632 455/90.3 |
| 2008/0259551 A1* | 10/2008 | Gavenda .................. | G06F 1/16 361/679.31 |
| 2013/0203473 A1* | 8/2013 | Kota .................... | H04M 1/0202 455/575.8 |
| 2016/0055357 A1* | 2/2016 | Hicks ................. | G06K 7/10881 235/383 |

* cited by examiner

*Primary Examiner* — Toan Ly
(74) *Attorney, Agent, or Firm* — Chun-Ming Shih; HDLS IPR Services

(57) ABSTRACT

A mobile data collector with a keyboard, used to be combined with a mobile electronic device, includes a protective cover, a data reader, and a keyboard module. The protective cover has a bottom plate and a surrounding frame. The surrounding frame is disposed along the perimeter of the bottom plate to form a first accommodation space and a second accommodation space located at one side of the first accommodation space. The mobile electronic device is disposed at the first accommodation space. The data reader is located at a side of the bottom plate opposite to the mobile electronic device and is electrically connected to the mobile electronic device. The keyboard module is disposed in the second accommodation space and electrically connected to the data reader. Thus, the mobile data collector has an input interface for inputting or modifying related information, which enhances usage convenience.

8 Claims, 4 Drawing Sheets

MOBILE DATA COLLECTOR WITH KEYBOARD

BACKGROUND OF THE INVENTION

Field of the Invention

The present invention relates to a data collector and in particular to a data collector which is combined with a mobile electronic device.

Description of Prior Art

The data reader is mainly to read the barcode of the product package to obtain the product information contained in the barcode. On the other hand, with the widespread popularity of mobile electronic devices such as smart phones and tablet computers and their increasing functions, the design of the data collector has been combined with that of the mobile electronic device. That is, the information obtained by scanning the barcode is transferred to the mobile electronic device for the following process.

The arrangement of the current data collector combined with the mobile electronic device is mainly by attaching the mobile electronic device to one side of a carrier and attaching the data reader to another side of the carrier. Further, a transmission cable is used to connect the data reader and the mobile electronic device such that the data transmission in between can be established.

However, the above-mentioned carrier does not have an input interface and a touch screen is almost used for the input of the mobile device. Consequently, the touch-to-input function may fail for the user wearing gloves or in wet weather such that the user cannot input or modify related information, which causes serious usage inconvenience. In view of this, how to overcome the above disadvantages is the research motivation of the inventor.

SUMMARY OF THE INVENTION

One objective of the present invention is to provide a mobile data collector with a keyboard, which is used to be combined with a mobile electronic device, such that the mobile data collector has a keyboard module for inputting or modifying related information to enhance usage convenience.

Another objective of the present invention is to provide a mobile data collector with a keyboard in which the protective cover thereof can provide the buffer and waterproof effects for the mobile electronic device and the keyboard module.

To achieve the above objectives, the present invention provides a mobile data collector with a keyboard, which is used to be combined with a mobile electronic device. The mobile data collector comprises a protective cover, a data reader, and a keyboard module. The protective cover has a bottom plate and a surrounding frame. The surrounding frame is disposed along the perimeter of the bottom plate to form a first accommodation space and a second accommodation space located at one side of the first accommodation space. The mobile electronic device is disposed in the first accommodation space. The data reader is located at a side of the bottom plate, opposite to the mobile electronic device. The data reader is electrically connected to the mobile electronic device. The keyboard module is disposed in the second accommodation space and electrically connected to the data reader.

Yet another objective of the present invention is to provide a mobile data collector with a keyboard in which only the protective cover needs to be designed, used with the components in common like the data reader and the keyboard module, to form a brand-new mobile data collector with a keyboard after combined with other types of the mobile electronic device. In this way, the time, cost, and labor for the development can be reduced and a mobile data collector with a keyboard can be provided to meet the requirements of the user.

Compared with the traditional mobile data collector, the mobile data collector with the keyboard of the present invention comprises a protective cover, a data reader, and a keyboard module. One side of the protective cover can be disposed with a mobile electronic device and a keyboard module; the data reader is disposed on another side of the protective cover. Thus, the protective cover can provide the buffer and waterproof effects for the mobile electronic device and the keyboard module; the information scanned by the data reader can be transferred to the mobile electronic device. Also, the mobile data collector is equipped with a keyboard module enabling the related information to be inputted or changed, which improves usage convenience. Additionally, only the protective cover needs to be re-designed for the mobile data collector with a keyboard of the present invention, which is then used with the components in common like the data reader and the keyboard module, to form a brand-new mobile data collector after combined with other types of the mobile electronic device. In this way, the time, cost, and labor for the development can be reduced and a mobile data collector with a keyboard can be provided to meet the requirements of the user.

DETAILED DESCRIPTION OF THE INVENTION

To understand the technical features and details of the present invention, please refer to the following detailed description and accompanying figures. However, the accompanying figures are only for reference and explanation, but not to limit the scope of the present invention.

Figure 1:
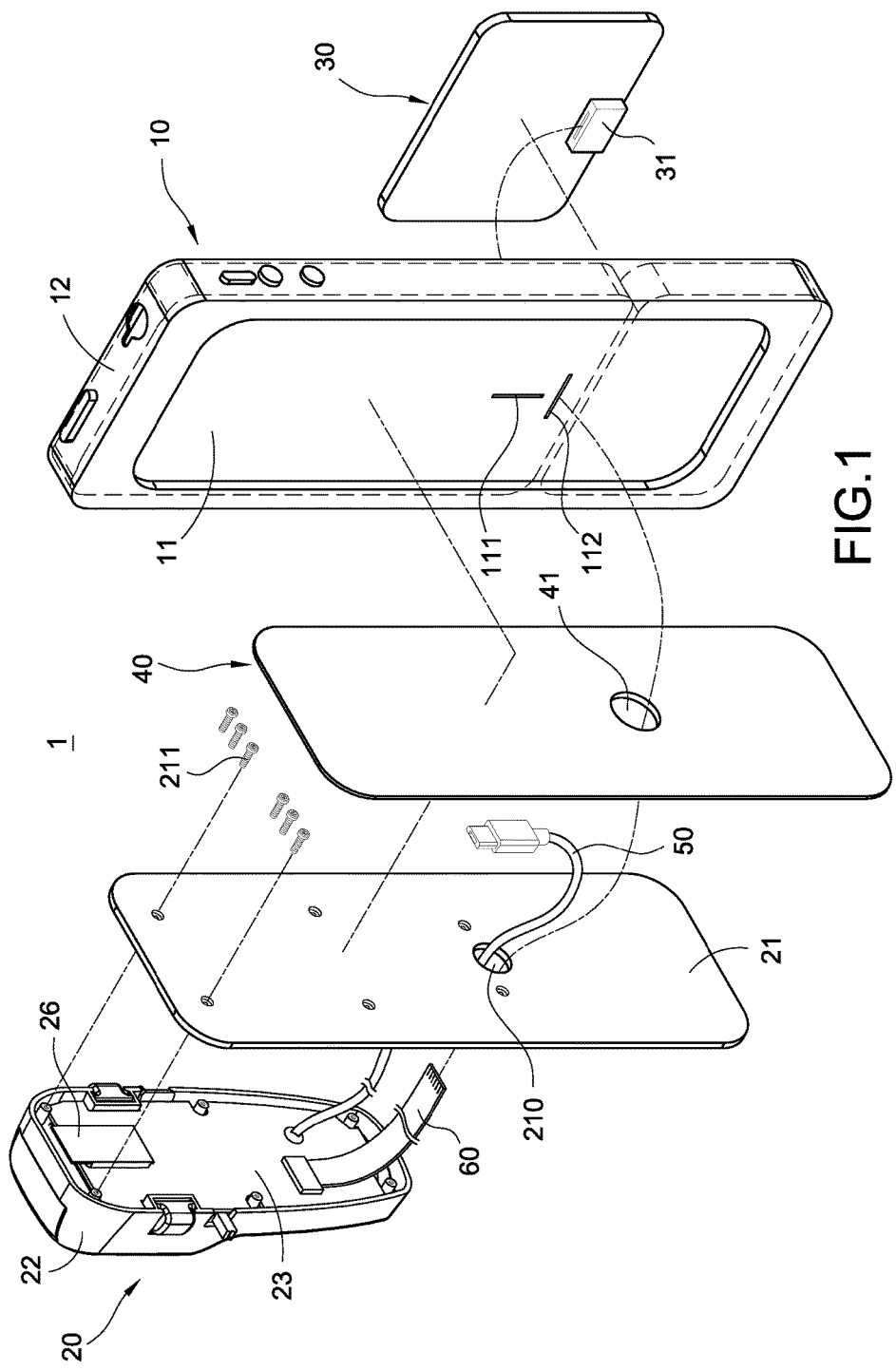
FIG. 1 is a perspective exploded view of the mobile data collector with a keyboard of the present invention.
Figure 2:
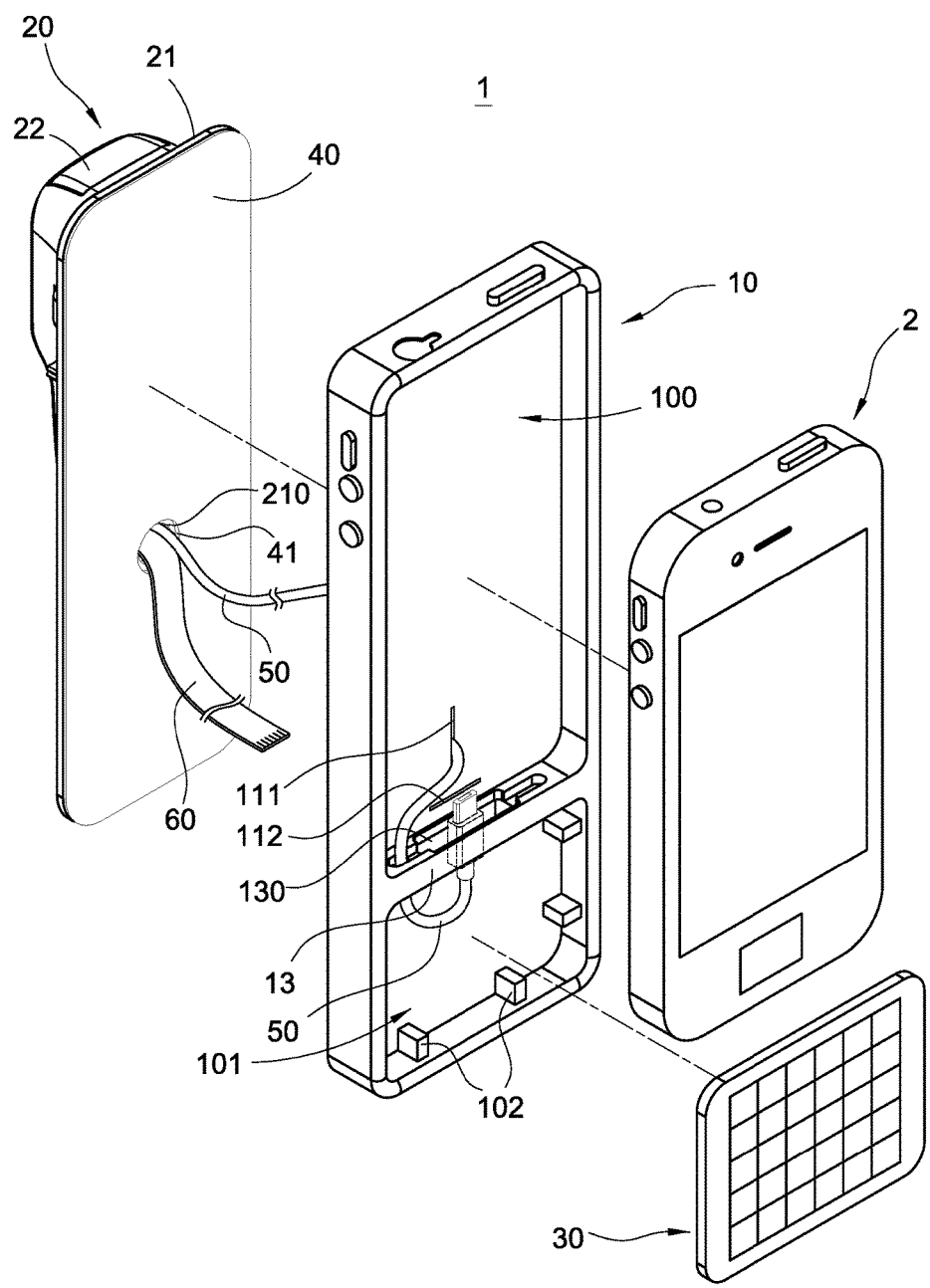
FIG. 2 is a combined view of the mobile data collector of the present invention and the mobile electronic device.

Please refer to FIGS. 1 and 2, which are the perspective exploded view of the mobile data collector with a keyboard of the present invention and the combined view of the mobile data collector and the mobile electronic device, respectively. The present invention provides a mobile data collector 1 with a keyboard, which is used to be combined with a mobile electronic device 2 such as a smart phone. The mobile data collector 1 comprises a protective cover 10, a data reader 20, and a keyboard module 30. The mobile electronic device 2 and the keyboard module 30 are disposed in the protective cover 10. Also, the data reader 20 is disposed at another side of the protective cover 10, opposite to the mobile electronic device 2.

The protective cover 10 has a bottom plate 11 and a surrounding frame 12. The surrounding frame 12 is disposed along the perimeter of the bottom plate 11 to form a first accommodation space 100 and a second accommodation space 101 located at one side of the first accommodation space 100. The mobile electronic device 2 is disposed in the first accommodation space 100.

The data reader 20 is located at another side of the bottom plate 11 opposite to the mobile electronic device 2. The data reader 20 is electrically connected to the mobile electronic device 2. Furthermore, the keyboard module 30 is disposed in the second accommodation space 101 and electrically connected to the data reader 20. In this way, the information scanned by the mobile data collector 1 can be transferred to the mobile electronic device 2 for the following process in the mobile electronic device 2 through the keyboard module 30.

In the current embodiment, the data reader 20 is further combined with a cover plate 21. In the current embodiment, the cover plate 21 is screwed firmly to the bottom side of the data reader 20 by means of several screws 211. The mobile data collector 1 further comprises an adhesive component 40 disposed between the cover plate 21 of the data reader 20 and the bottom plate 11 of the protective cover 10. The data reader 20 is combined with the bottom plate 11 be means of the adhesive component 40. In the current embodiment, the adhesive component 40 is an adhesive sheet but is not limited to this; the adhesive component 40 may be an adhesive liquid.

In an embodiment of the present invention, the bottom plate 11 and the surrounding frame 12 are made of silicone. Preferably, the bottom plate 11 and the surrounding frame 12 integrally form the protective cover 10. The protective cover 10 is elastic such that the mobile electronic device 2 and the keyboard module 30 can be disposed in the protective cover 10.

In particular, the protective cover 10 can provide a buffer effect for the mobile electronic device 2 and the keyboard module 30. In addition, the protective cover 10 can also provide a better waterproof effect for the mobile electronic device 2 and the keyboard module 30. Thus, the protective cover 10 can prevent the mobile electronic device 2 and the keyboard module 30 from being struck by external force. The influence of external moisture on the normal operations of the mobile electronic device 2 and the keyboard module 30 can also be avoided.

The mobile data collector 1 further comprises a transmission cable 50 and a connecting cable 60. The transmission cable 50 is connected to the data reader 20 which is electrically connected to the mobile electronic device 2 by means of the transmission cable 50. Moreover, the connecting cable 60 is electrically connected to the data reader 20 which is electrically connected to the keyboard module 30 by means of the connecting cable 60. Preferably, the keyboard module 30 has a connector 31. Two ends of the connecting cable 60 are individually connected to the data reader 20 and the keyboard module 30. The detailed arrangement of the transmission cable 50 and the connecting cable 60 are described below.

In the current embodiment, a first slit 111 is disposed on the bottom plate 11 of the protective cover 10 corresponding to the transmission cable 50; the data reader 20 is electrically connected to the mobile electronic device 2 by means of the transmission cable 50 passing through the first slit 111. Also, a second slit 112 is disposed on the bottom plate 11 of the protective cover 10 corresponding to the connecting cable 60. The data reader 20 is plugged to the connector 31 by means of the connecting cable 60 passing through the second slit 112 such that the data reader 20 is electrically connected to the keyboard module 30.

It is noted that because the protective cover 10 is made of elastic material like silicone, the first slit 111 and the second slit 112 will flexibly clamp the transmission cable 50 and the connecting cable 60, respectively, due to flexible recovering force after the transmission cable 50 and the connecting cable 60 individually pass through the first slit 111 and the second slit 112. Thus, the protective cover 10 still maintains a better waterproof effect.

Also, in an embodiment of the present invention, the protective cover 10 further comprises a separating rib 13 formed between the first accommodation space 100 and the second accommodation space 101. The separating rib 13 is provided with a slot 130. The transmission cable 50 passes through the first slit 111 and the slot 130 in sequence to electrically connect the mobile electronic device 2. The connecting cable 60 passes through the second slit 112 and the slot 130 in sequence to electrically connect the keyboard module 30.

In the current embodiment, the cover plate 21 is provided with a hole 210. Besides, the adhesive component 40 is provided with a throughhole 41 corresponding to the hole 210. The transmission cable 50 and the connecting cable 60 both pass through the hole 210 of the cover plate 21 and the throughhole 41 of the adhesive component and then individually pass through the first slit 111 and the second slit 112.

In the current embodiment, there are plural supporting blocks 102 formed on the inner wall of the second accommodation space 101 of the protective cover 10. One end of the transmission cable 50 is connected to the data reader 20. The other end of the transmission cable 50 passes through the hole 210 and then through the first slit 111 into the first accommodation space 100. After that, the other end of the transmission cable 50 passes through the slot 130 of the separating rib 13 into the second accommodation space 101. Finally, the transmission cable 50 returns and passes through the slot 130 into the first accommodation space 100 to be plugged to the mobile electronic device 2 in the first accommodation space 100.

It is noted that, in practical use, only the first slit 111 or the second slit 112 needs to be disposed on the bottom plate 11 of the protective cover 10. Thus, the transmission cable 50 and the connecting cable 60 both can pass through the first slit 111 or the second slit 112 to be connected to the mobile electronic device 2 and the keyboard module 30, respectively. Besides, as for the arrangement of the first slit 111 and the second slit 112, the numbers, locations, and orientations thereof can be adjusted or modified to meet users' requirements.

It is worthy to note that the keyboard module 30 is disposed on the supporting blocks 102 in the second accommodation space 101 and the arrangement of the supporting blocks 102 can provide a supporting space in the second accommodation space 101 such that the transmission cable 50 can be disposed in the supporting space and the keyboard module 30 can be disposed in the second accommodation space 101 without compressing the transmission cable 50. As such, the keyboard module 30 can be stably disposed in the second accommodation space 101 and the connection of transmission cable 50 can be stably maintained.

Figure 3:
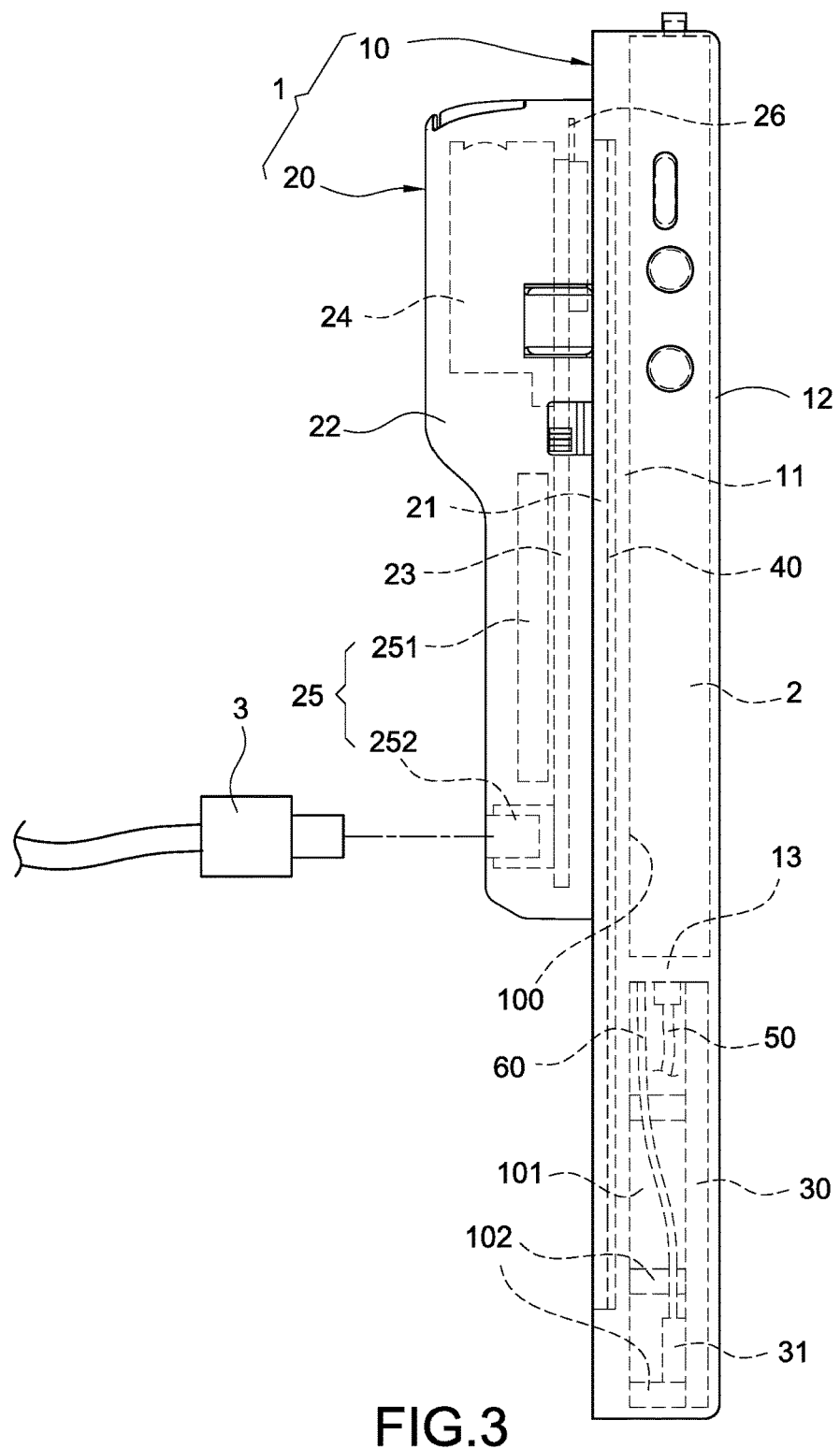
FIG. 3 is a cross-sectional view of the mobile data collector of the present invention and the mobile electronic device after combination.

Please refer to FIG. 3, which is a cross-sectional view of the mobile data collector of the present invention and the mobile electronic device after combination. In an embodiment of the present invention, the data reader 20 comprises a case 22, a circuit board 23 disposed in the case 22, a barcode scanning module 24 disposed at the front end of the case 22, a battery module 25 disposed in the case 22, and a wireless transmission module 26. The wireless transmission module 26 is electrically connected to the circuit board 23 and disposed on a side of the barcode scanning module 24.

As shown in FIG. 3, the battery module 25 comprises a rechargeable battery 251 and an electrical connector 252, both disposed on the circuit board 23. The rechargeable battery 251 provides power for the operation of the data reader 20. Besides, the rechargeable battery 251 and the electrical connector 252 are electrically connected to the circuit board 23. The electrical connector 252 is exposed outside the case 22 to be connected to mains electricity (or a power supply) which charges the rechargeable battery 251. Also, the wireless transmission module 26 can be a Bluetooth module which can be disposed on the bottom side of the barcode scanning module 24 for wireless communication with the mobile electronic device 2.

Figure 4:
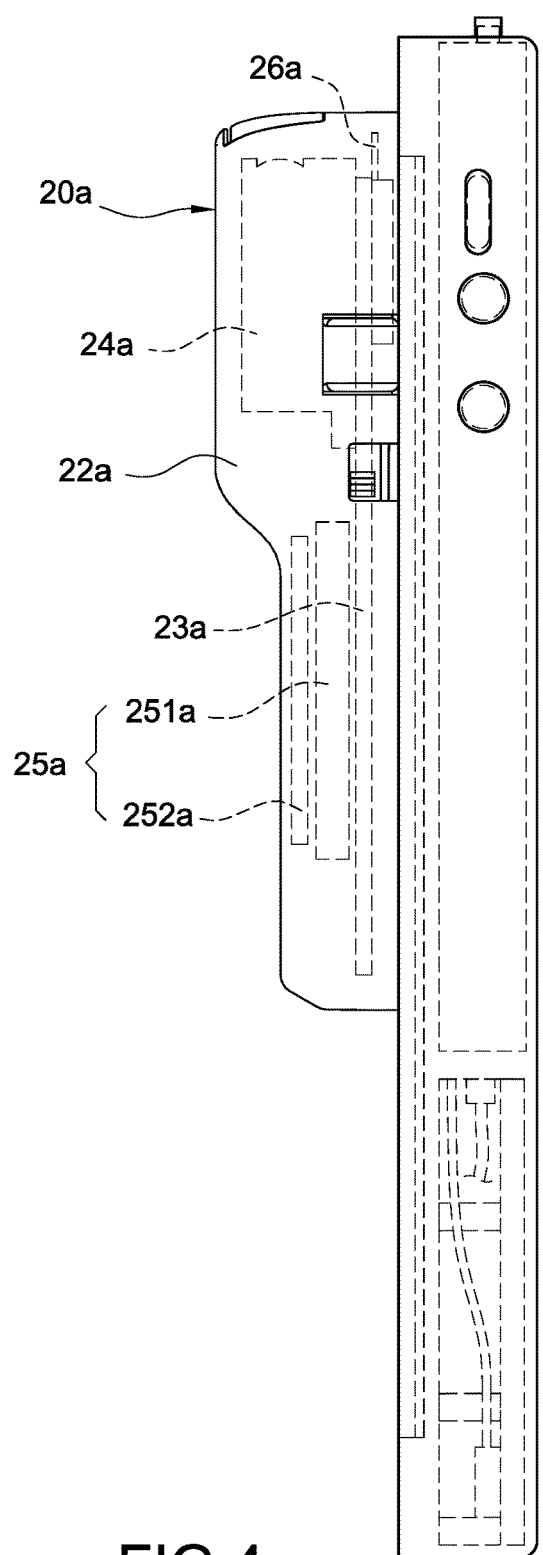
FIG. 4 is a cross-sectional view of the mobile data collector equipped with an NFC component or a wireless charger according to another embodiment of the present invention.

Please further refer to FIG. 4, which shows the mobile data collector equipped with a battery module according to another embodiment of the present invention. In an embodiment of the present invention, the data reader 20a comprises a case 22a, a circuit board 23a, a barcode scanning module 24a, a battery module 25a, and a wireless transmission module 26a. Compared with FIG. 3, the battery module 25a in the current embodiment comprises a rechargeable battery 251a and a wireless charger 252a, both disposed on the circuit board 23a. One side of the wireless charger 252a is close to the inner wall of the case 22a, which facilitates the power charging from an external power supply to the wireless charger 252.

It is noted that an NFC (Near Field Communication) component can be disposed at the location of the wireless charger 252a as an option for near-field communication.

Besides, it is worthy to note that the above-mentioned barcode scanning modules 24, 24a can be slot readers. In practical use, a slot can be formed on the case 22a corresponding to the slot reader. In this way, the user can use the slot reader to access data, which improves the applicability of the present invention.

It is also noted that the mobile data collector with a keyboard of the present invention can be combined with any type of the mobile electronic device. In practice, only the protective cove needs to be re-designed, used with the components in common like the data reader and the keyboard module. Consequently, the re-designed protective cover combined with other types of mobile electronic device just forms a brand-new mobile data collector with a keyboard. Therefore, the time, cost, and labor for the development can be reduced and a mobile data collector with a keyboard can be provided to meet users' requirements.

The embodiments described above are only preferred ones of the present invention and are not to limit the scope of the present invention. All the equivalent modifications and variations applying the specification and figures of the present invention should be embraced by the claimed scope of the present invention.

What is claimed is:

1. A mobile data collector, used to be combined with a mobile electronic device, comprising:
    a protective cover having a bottom plate and a surrounding frame, wherein the surrounding frame is disposed along the perimeter of the bottom plate to form a first accommodation space and a second accommodation space located at one side of the first accommodation space, wherein the mobile electronic device is disposed at the first accommodation space;
    a data reader located at a side of the bottom plate opposite to the mobile electronic device, wherein the data reader is electrically connected to the mobile electronic device; and
    a keyboard module disposed in the second accommodation space and electrically connected to the data reader,
    wherein the bottom plate and the surrounding frame are made of silicone and integrally form the protective cover, wherein the bottom plate is provided with a first slit;
    wherein the data reader further comprises a transmission cable, wherein the data reader is electrically connected to the mobile electronic device by means of the transmission cable passing through the first slit;
    wherein the data reader further comprises a connecting cable, wherein a second slit is disposed on the bottom plate corresponding to the connecting cable, wherein the data reader is electrically connected to the keyboard module by means of the connecting cable passing through the second slit;
    wherein the protective cover further comprises a separating rib which has a slot and is formed between the first accommodation space and the second accommodation space, wherein the transmission cable passes through the first slit and the slot in sequence to electrically connect the mobile electronic device, wherein the connecting cable passes through the second slit and the slot in sequence to electrically connect the keyboard module.

2. The mobile data collector according to claim 1, further comprising an adhesive component disposed between the data reader and the bottom plate, wherein the data reader is combined with the bottom plate by means of the adhesive component.

3. The mobile data collector according to claim 1, wherein the data reader comprises a case, a circuit board disposed in the case, a barcode scanning module disposed at the front end of the case, and a battery module disposed in the case, wherein a cover plate is combined with the case and includes the circuit board inside.

4. The mobile data collector according to claim 3, wherein the battery module comprises a rechargeable battery and an electrical connector, both disposed on the circuit board, wherein the electrical connector is exposed outside the case.

5. The mobile data collector according to claim 3, wherein the battery module comprises a rechargeable battery and a wireless charger, both disposed on the circuit board, wherein one side of the wireless charger is close to the inner wall of the case.

6. The mobile data collector according to claim 5, wherein an NFC component is disposed at the location of the wireless charger.

7. The mobile data collector according to claim 3, wherein the data reader further comprises a wireless transmission module performing wireless transmission with the mobile electronic device, wherein the wireless transmission module is electrically connected to the circuit board and disposed on a side of the barcode scanning module.

8. The mobile data collector according to claim 3, wherein at the location of the barcode scanning module is disposed a slot reader.

* * * * *